United States Patent [19]

Chu et al.

[11] Patent Number: 4,866,652

[45] Date of Patent: Sep. 12, 1989

[54] FLOATING POINT UNIT USING COMBINED MULTIPLY AND ALU FUNCTIONS

[75] Inventors: George K. Chu, Sunnyvale; Jan Fandrianto, Los Gatos; Y. W. Sing, Cupertino, all of Calif.

[73] Assignee: Weitek Corporation, Sunnyvale, Calif.

[21] Appl. No.: 92,023

[22] Filed: Sep. 1, 1987

[51] Int. Cl.[4] ............................................. G06F 7/48
[52] U.S. Cl. .................................................. 364/748
[58] Field of Search ....................... 364/748, 736, 768

[56] References Cited

U.S. PATENT DOCUMENTS 4,760,551 7/1988 Yokomizo et al. ................. 364/748

Primary Examiner—Gene Wan

Attorney, Agent, or Firm—Townsend and Townsend

[57] ABSTRACT

A method and apparatus for combining the multiply and ALU functions for floating point numbers to enable the completion of a multiply-accumulate operation in a shorter time. The multiplied fraction is left in sum and carry form and is provided in this form to the ALU, eliminating the CP adder from the multiplier. The normalization of the fraction and the corresponding changes to the exponent in the multiplier are also eliminated. The ALU can combine the sum and carry of the product fraction simultaneously if the exponents are sufficiently similar. Otherwise, the sum and carry of the fraction product is combined first and compared with the new fraction, with the smaller of the fractions being right shifted prior to their combination.

13 Claims, 3 Drawing Sheets

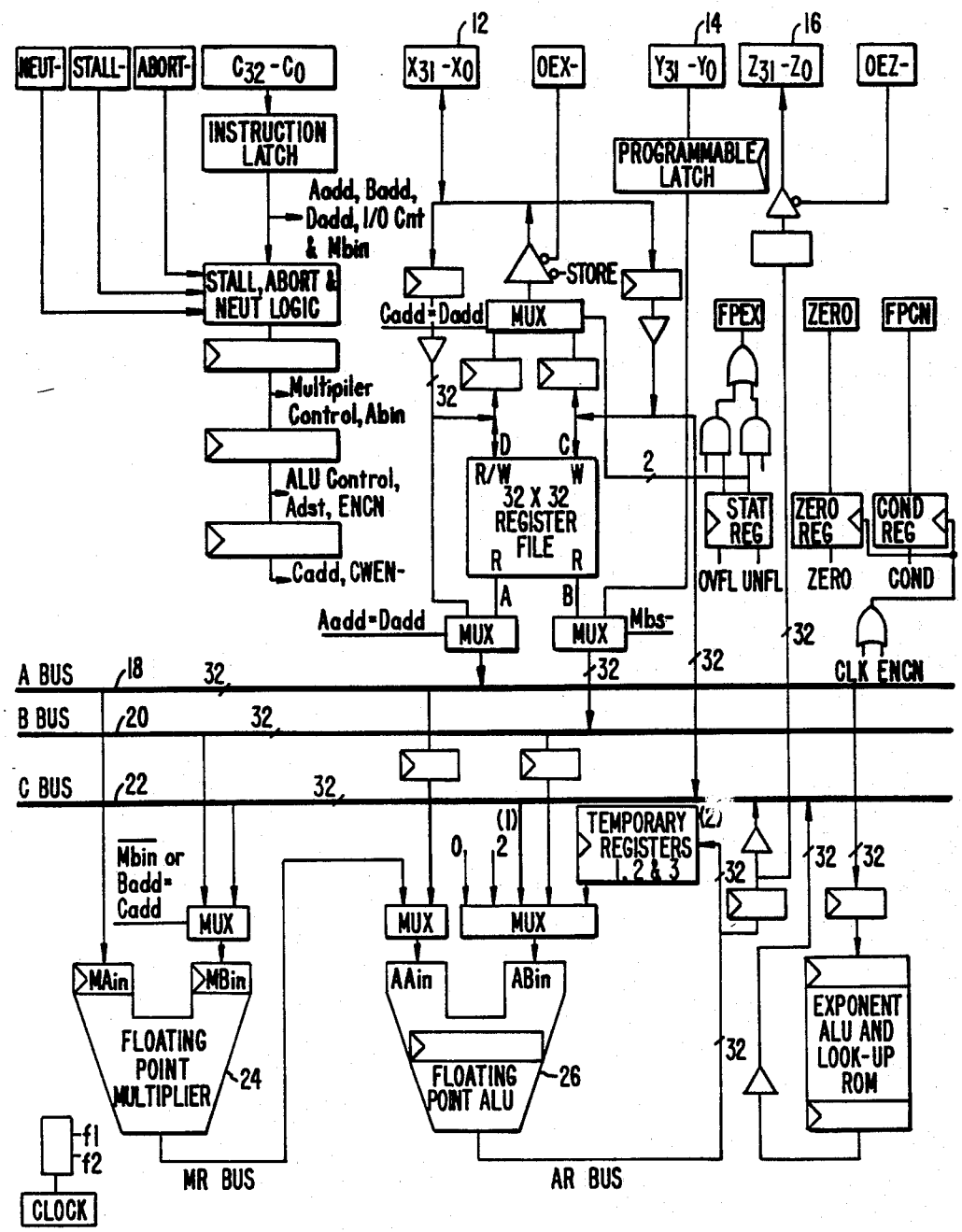
FIG.—1.  PRIOR ART

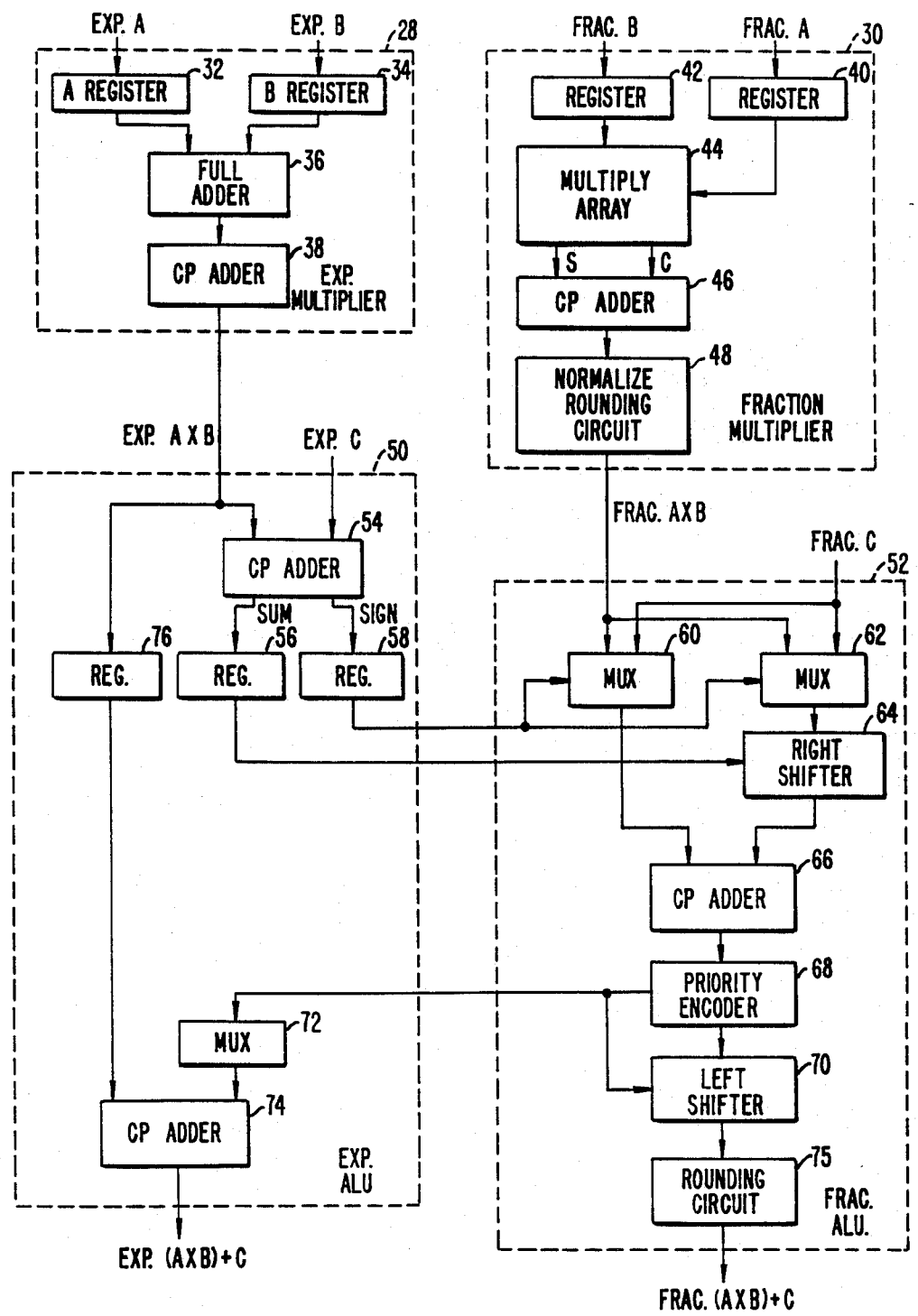
FIG.—2. PRIOR ART

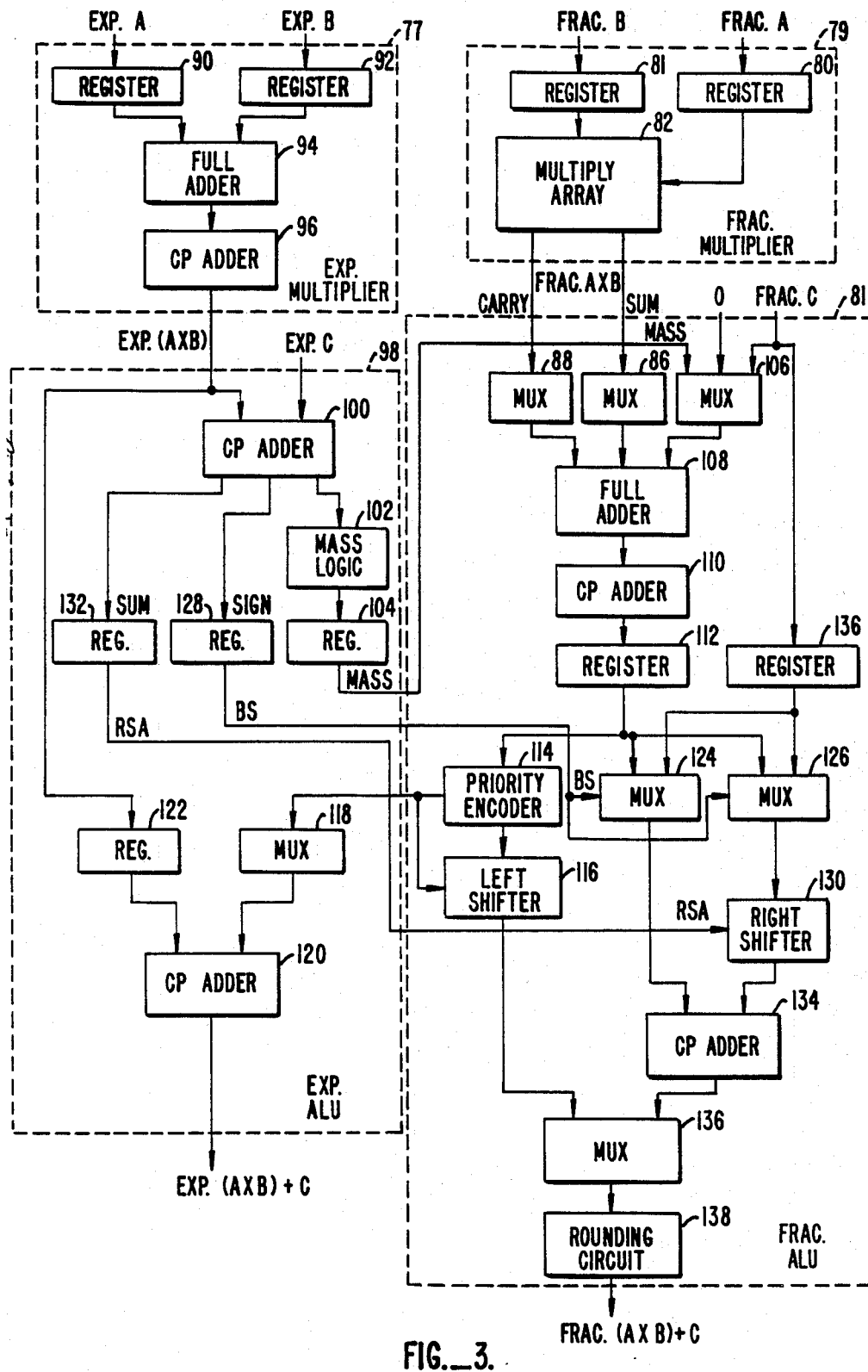
FIG._3.

FLOATING POINT UNIT USING COMBINED MULTIPLY AND ALU FUNCTIONS

BACKGROUND

The present invention relates to the multiplier and arithmetic logic unit functions for floating point numbers.

Floating point systems typically contain a separate multiplier and arithmetic logic unit (ALU). The multiplier has an exponent portion which adds together the exponents of the two multiplicands and a fraction unit with a multiplying array for multiplying the two fraction portions of the multiplicands together. After the fraction is multiplied, a carry propagate add is performed and the resulting fraction is normalized and rounded. The normalization involves shifting the decimal point to put the fraction in format of 1.XX ... X. The combined exponent then has a number added to it corresponding to this shift amount to produce the final product.

The arithmetic logic unit can receive two numbers for addition or subtraction, one of which numbers could be the result of a multiply operation. A single multiply operation typically takes two clock cycles and a single addition operation also takes typically two clock cycles. Thus, in order to do a multiply-accumulate operation, four clock cycles are needed.

SUMMARY OF THE INVENTION

The present invention is a method and apparatus for combining the multiply and ALU functions for floating point numbers to enable the completion of a multiply-accumulate operation in a shorter time. The multiplied fraction is left in sum and carry form and is provided in this form to the ALU, eliminating the carry propagate adder from the multiplier. The normalization of the fraction and the corresponding changes to the exponent in the multiplier are also eliminated. The ALU can combine the sum and carry of the product fraction simultaneously if the exponents are sufficiently similar. Otherwise, the sum and carry of the fraction product is combined first and compared with the new fraction, with the smaller of the fractions being right shifted prior to their combination.

The ALU thus uses two data paths. For a first data path, where the exponents differ by 1, 0, −1, −2 the sum and carry of the product fraction are simultaneously combined with the fraction of the additional number in a full adder and a carry propagate adder (CP adder). The result is then provided to a priority encoder which determines the number of leading zeros and left shifts the fraction accordingly, while changing the product exponent by a corresponding amount to give an appropriate exponent value.

If the difference between the exponent value for the product and the new number is other than 1, 0, −1 or −2, the sum and carry bits of the fraction product are combined without the new fraction. The exponent of the product and the new number are compared and the fraction corresponding to the smaller exponent is provided through a multiplexer to a right shifter so that the fractions can be aligned. The two fractions are then combined in a CP adder.

The present invention thus provides a circuit which can perform a multiply-accumulate function in three cycles. The structure results in a pure add or pure multiply function also requiring three clock cycles. This, however, is an advantage since a programmer does not have to account for differing clock cycles for different functions.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a block diagram of a three port chip which can incorporate the structure of the present invention;

FIG. 2 is a block diagram of a typical prior art multiplier and accumulator; and FIG. 3 is a block diagram of a combined multiplier and ALU according to the present invention.

DETAILED DESCRIPTION OF THE PREFERRED EMBODIMENTS

FIG. 1 shows a floating point unit having three input ports 12, 14 and 16. The unit also has three busses 18, 20 and 22. A floating point multiplier 24 has an output coupled through a multiplexer to a floating point ALU 26. A number of data paths from the three busses are provided to multiplier 24 and ALU 26 to enhance the flexibility of the system.

FIG. 2 is a block diagram showing the contents of a multiplier and an ALU of the prior art which could be used in a system similar to that of FIG. 1. The multiplier has an exponent multiplier 28 and a fraction multiplier 30 plus a sign unit (not shown). Exponent multiplier 28 receives A and B exponents which are stored in A and B registers 32 and 34, respectively. The contents of these two registers are added in a full adder 36 and a CP adder 38 to produce the combined exponent for the product.

The fractions for A and B are combined in circuit 30 by being provided to registers 40 and 42, respectively. The contents of these registers are multiplied together in a multiplier array 44 and the result in sum and carry form is provided to a CP adder 46. The output of CP adder 36 is in sum form and is provided to normalizing and rounding circuit 48. Circuit 48 will put the fraction in the form of 1.XX ... X by appropriate shifting, with the product exponent being changed accordingly.

The product exponent is then provided to an ALU exponent unit 50 and the product fraction is provided to an ALU fraction unit 52. A CP adder 54 in unit 50 determines the difference between the product exponent (A×B) and the exponent of the new number, C. The magnitude of the difference is provided to register 56 and the sign is provided to register 58. The sign from register 58 determines which number is smaller and is used as a select input to multiplexers 60, 62 of unit 52. The fraction with the smaller exponent is provided through a right shifter 64 to align it with the other fraction. The amount of the shift required is determined by the sum figure from register 56. The two fractions are then combined in the CP adder 66. The sum from CP adder 66 is provided to a priority encoder 68. Priority encoder 68 determines the number of leading zeros which is then provided to a left shifter 70 to shift the fraction until it is in the form of 1.XX ... X. The amount of a shift required is provided through a multiplexer 72 to a CP adder 74 where it is combined with the product exponent from a register 76 to produce the final exponent value. The fraction from left shifter 70 is provided through a rounding circuit 75 to an output of the ALU.

The circuit of the present invention which can be incorporated into the circuit of FIG. 1 is shown in FIG. 3. An exponent multiplier circuit 77 and a fraction multiplier circuit 79 are provided. Fraction multiplier 79 contains a pair of registers 80, 81 for receiving the two multiplicand inputs which are then multiplied in an array 82. As can be seen, fraction multiplier 76 does not include CP adder 46 or normalizing circuit 48 of FIG. 2. Instead, the fractional sum and carry are provided to multiplexers 86 and 88 in a fractional ALU circuit 84. The other inputs of these multiplexers are unrelated to the present invention and thus are not shown.

Exponent multiplier 77 is similar to exponent multiplier 28 of FIG. 2. A pair of registers 90, 92 provide the two exponents to a full adder 94 whose output is provided to a CP adder 96.

An exponent ALU circuit 98 combines the product exponent and the exponent of an additional number, C, in a CP adder 100. A mass logic unit 102 provides an output to a register 104 to a select input of a multiplexer 106. Multiplexer 106 determines whether the fractional value of the number C or a 0 will be supplied to a full adder 108 which also receives the sum and carry from the fraction product. Mass logic circuit 102 determines whether the exponents of the number are different by a large amount or differ by the values of 1, 0, −1 or −2, which would result in mass cancellation of digits. If the difference is not large, the fractional part of the number C can be combined with the sum and carry bits of the product fraction without first requiring a shift. Thus, the fraction C input of MUX 106 will be provided to full adder 108 where it is combined with the sum and carry of the product fraction. Full adder 108 converts the three inputs into two outputs which then must be further added in a CP adder 110 to reduce the number to one output per bit. The result is then stored in a register 112 and provided to a priority encoder 114 and left shifter 116. Priority encoder 114 and left shifter 116 perform the same function as in circuit 52 of FIG. 2 of determining the number of leading zeros and shifting the fraction accordingly. The amount of the shift is provided through a multiplexer 118 to a CP adder 120 where it is combined with the product exponent from a register 122. This left side data path of fractional ALU circuit 80 is thus used if the difference between the exponent of C and the product exponent (A×B) is 1, 0, −1 or −2.

Otherwise, a right side data path beginning with multiplexers 124 and 126 is used. In this case, a 0 input is provided to multiplexer 106 so that full adder 108 and CP adder 110 simply combine the carry and sum of the product fraction. The combined value from CP register 110 is then provided to multiplexer 124 if it has a larger exponent than the C exponent and is provided to multiplexer 126 if it has a smaller exponent than the C exponent. The determination of which exponent is larger or smaller is done by CP adder 100 with the sign indicating the relative size being stored in a register 128 from which is provided as a select input BS to multiplexers 124 and 126. The smaller fraction is then right shifted in right shifter 130 by an amount stored in sum register 132, which receives its value from CP adder 100 of exponent ALU 98. The two values are then combined in a CP adder 134 to complete the right data path. The fractional value of C is provided through a register 136 to the other one of multiplexers 124 and 126 not used by the product sum from register 112.

A multiplexer 136 provides the output from either the right data path or the left data path to a rounding circuit 138.

As can be seen, the present invention thus eliminates the CP adder and the normalizing and rounding circuitry from the multiplier and provides an intermediate result from the multiplier at the cost of adding a full adder 108 and a CP adder 110 to the fraction ALU. This then enables priority encoder 68 and left shifter 70 of FIG. 2 to be put in parallel with multiplexers 62 and 66 and right shifter 64. Additionally, some added logic is needed for comparing the exponents.

The result of the present invention is to decrease the number of cycles required for a multiply-accumulate function while increasing the number of cycles required for a simple multiply or a simple add. This results in the uniform cycle time of three clock cycles for any of these operations rather than different cycle times as would be required in the prior art circuit of FIG. 2.

As will be understood by those familiar with the art, the present invention may be embodied in other specific forms without departing from the spirit or essential characteristics thereof. For example, a circuit other than a multiplexer 106 could be used to provide the fraction C to full adder 108. Accordingly, the disclosure of the preferred embodiment of the invention is intended to be illustrative, but not eliminating, of the scope of the invention which is set forth in the following claims.

What is claimed is:

1. A method for performing a multiplication and an addition or subtraction of floating point numbers, comprising the steps of:
    (a) multiplying a first floating point number by a second floating point number to give an unnormalized product fraction in sum and carry form and a product exponent;
    (b) determining the difference between said product exponent and an exponent of a third floating point number;
    (c) if said difference is a first value, first combining the sum and carry bits of said product fraction to give a sum product fraction in sum form and subsequently combining said sum product fraction with a fraction of said third number; and
    (d) if said difference is a second value, simultaneously combining the sum and carry bits of said product fraction with said fraction of said third number to give a combined fraction.

2. The method of claim 1 wherein said second value is one of 1, 0, −1 and −2 and said first value is any other number.

3. The method of claim 1 wherein step (c) further includes:
    determining the smaller exponent of said product exponent and said third number exponent; and
    shifting, prior to said subsequent combining step, the one of said product fraction and said third number fraction having said smaller exponent to the right by an amount corresponding to said difference, said subsequent combining step including performing a CP addition of said product fraction and said third number fraction.

4. The method of claim 1 wherein step (d) futher includes:
    performing a priority encode of said combined fraction to determine the number of leading zeros; and left shifting said combined fraction by an amount equal to said number of leading zeros.

5. The method of claim 4 wherein step (d) further includes adding said number of leading zeros to said product exponent.

6. A method for performing a multiplication and an addition or subtraction of floating point numbers, comprising the steps of:
(a) multiplying a first floating point number by a second floating point number to give an unnormalized product fraction in sum and carry form and a product exponent;
(b) determining the difference between said product exponent and an exponent of a third floating point number;
(c) if said difference is other than 1, 0, −1 or −2 then
   (i) determining the smaller exponent of said product exponent and said third number exponent;
   (ii) shifting the one of said product fraction and said third number fraction having said smaller exponent to the right by an amount corresponding to said difference; and
   (iii) performing a carry propagate addition of said product fraction and said third number fraction; and
(d) if said difference is 1, 0, −1 or −2, then
   (i) simultaneously combining the sum and carry bits of said product fraction with said fraction of said third number to give a combined fraction;
   (ii) performing a priority encode of said combined fraction to determine the number of leading zeros;
   (iii) left shifting said combined fraction by an amount equal to said number of leading zeros; and
   (iv) adding said number of leading zeros to said product exponent.

7. An apparatus for performing a multiplication and an addition or subtraction of floating point numbers, comprising:
means for multiplying a first floating point number by a second floating point number to give an unnormalized product fraction in sum and carry form and a product exponent;
means for determining the difference between said product exponent and an exponent of a third floating point number;
means, if said difference is a first value, for first combining the sum and carry bits of said product fraction to give a sum product fraction in sum form and subsequently combining said sum product fraction with a fraction of said third number; and
means, if said difference is a second value, for simultaneously combining the sum and carry bits of said product fraction with said fraction of said third number to give a combined fraction.

8. The apparatus of claim 7 wherein said second value is one of 1, 0, −1 and −2 and said first value is any other number.

9. The apparatus of claim 7 wherein said means for first combining further includes:
means for determining the smaller exponent of said product exponent and said third number exponent;
means for shifting the one of said product fraction and said third number fraction having said smaller exponent to the right by an amount corresponding to said difference; and
means for performing a CP addition of said product fraction and said third number fraction.

10. An ALU for adding a first floating point number in sum and carry form and a second floating point number in sum form, comprising:
a full adder coupled to inputs for the sum and carry bits of said first number and the bits of said second number;
a first CP adder coupled to an output of said full adder; p1 first and second data paths coupled to an output of said CP adder; and
a second CP adder having a first input coupled to said second data path and a second input coupled to said input fur said second number, such that said second number can be combined in said full adder for a first condition, with an output being provided on said first data path, bypassing said second CP adder, and said second number can be combined in said second CP adder with a result of said full adder and said first CP adder for a second condition, using said second data path.

11. The ALU of claim 10 further comprising first and second multiplexers coupled between said first CP adder and said second CP adder; and
a right shifter circuit coupled between said second multiplexer and said second carry propagate adder.

12. The ALU of claim 10 wherein said first data path comprises a priority encoder having an input coupled to said first carry propagate adder and a left shifter circuit having an input coupled to an output of said priority encoder.

13. The ALU of claim 10 further comprising:
a third carry propagate adder having inputs coupled to receive a product exponent and the exponent of said second number;
mass logic means, coupled to an output of said third carry propagate adder, for providing an output having a first value if the difference between said exponents is 1, 0, −1 or −2; and
a multiplexer having an output coupled to said full adder, first and second inputs coupled to receive the fraction of said second number and 0, respectively, and a select input coupled to said mass logic means such that said first value of said mass logic means will select the second number input and a second value of said mass logic means will select said 0 input.

* * * * *